(12) United States Patent
Bernhardt et al.

(10) Patent No.: US 11,427,306 B2
(45) Date of Patent: Aug. 30, 2022

(54) PIEZOELECTRIC THRUST VECTOR CONTROL FOR DUAL-MODE UNMANNED AERIAL VEHICLE

(71) Applicant: The Boeing Company, Chicago, IL (US)

(72) Inventors: Roger D. Bernhardt, O'Fallon, MO (US); Dan J. Clingman, Milton, WA (US)

(73) Assignee: The Boeing Company, Chicago, IL (US)

( * ) Notice: Subject to any disclaimer, the term of this patent is extended or adjusted under 35 U.S.C. 154(b) by 750 days.

(21) Appl. No.: 16/359,342

(22) Filed: Mar. 20, 2019

(65) Prior Publication Data

US 2020/0298961 A1    Sep. 24, 2020

(51) Int. Cl.
| | |
|---|---|
| *B64C 29/00* | (2006.01) |
| *B64C 15/02* | (2006.01) |
| *B64C 29/04* | (2006.01) |
| *B64C 39/02* | (2006.01) |
| *F04D 13/06* | (2006.01) |
| *F04D 13/12* | (2006.01) |
| *F04D 15/00* | (2006.01) |
| *B64D 27/18* | (2006.01) |

(52) U.S. Cl.
CPC .......... *B64C 15/02* (2013.01); *B64C 29/0091* (2013.01); *B64C 29/04* (2013.01); *B64C 39/024* (2013.01); *B64D 27/18* (2013.01); *F04D 13/06* (2013.01); *F04D 13/12* (2013.01); *F04D 15/00* (2013.01); *B64C 2201/104* (2013.01); *B64C 2201/108* (2013.01)

(58) Field of Classification Search
CPC ....... B64C 11/001; B64C 19/00; B64C 23/00; B64C 23/005; B64C 29/02; B64C 29/04; B64C 29/0091; B64C 39/024
See application file for complete search history.

(56) References Cited

U.S. PATENT DOCUMENTS

| | | | |
|---|---|---|---|
| 4,005,823 A | * | 2/1977 | Thayer ...................... B64C 9/38 239/265.37 |
| 4,657,209 A | | 4/1987 | Edgley |

(Continued)

FOREIGN PATENT DOCUMENTS

CA    2623644 A1 *  9/2008  ................ F02C 3/13

*Primary Examiner* — Richard R. Green
*Assistant Examiner* — Michael A. Fabula
(74) *Attorney, Agent, or Firm* — Ostrager Chong Flaherty & Broitman P.C.

(57) ABSTRACT

A ducted-fan unmanned aerial vehicle (UAV) capable of low-energy high-rate maneuvers for both vertical roll control and horizontal pitch control. The UAV includes ducted fans which are with respective piezoelectric-actuated thrust vectoring flaps. Thrust vector control is achieved by controlling the angular positions of a plurality of thrust vector flaps pivotably coupled at respective outlets of a plurality of ducts having fan rotors at the inlets. Each thrust vectoring flap has only one degree of freedom in the frame of reference of the UAV, namely, rotation about a single axis that is perpendicular to the axis of the duct. The angular position of the flap is controlled by sending electrical signals to a piezoelectric actuator (e.g., a piezoelectric bimorph actuator) having a voltage sufficient to cause the piezoelectric actuator to bend.

20 Claims, 14 Drawing Sheets

(56) References Cited

U.S. PATENT DOCUMENTS

| | | | |
|---|---|---|---|
| 5,131,603 A * | 7/1992 | Meyers | B64C 27/82 244/110 B |
| 5,531,406 A * | 7/1996 | Redekopp | B64C 21/025 244/209 |
| 5,687,907 A * | 11/1997 | Holden | B64C 15/02 60/230 |
| 6,220,550 B1 * | 4/2001 | McKillip, Jr. | B64C 27/001 114/144 R |
| 6,307,301 B1 | 10/2001 | Ngo et al. | |
| 7,579,755 B2 | 8/2009 | Clingman | |
| 7,658,346 B2 | 2/2010 | Goossen | |
| 7,737,608 B2 | 6/2010 | Ruggeri et al. | |
| 8,104,707 B1 | 1/2012 | Ohanian, III | |
| 8,191,826 B2 * | 6/2012 | Daynes | F01D 5/148 244/200 |
| 8,240,597 B2 | 8/2012 | Entsminger et al. | |
| 9,038,942 B2 * | 5/2015 | Sreetharan | B64C 33/00 244/72 |
| 9,457,887 B2 * | 10/2016 | Roe | B64C 3/44 |
| 9,803,666 B2 | 10/2017 | Whalen et al. | |
| 9,882,115 B2 | 1/2018 | Clingman et al. | |
| 9,902,494 B2 | 2/2018 | Morris | |
| 11,203,409 B2 * | 12/2021 | Fenske | B64C 3/52 |
| 2005/0133664 A1 * | 6/2005 | Cummings | B64C 15/12 244/12.5 |
| 2008/0092354 A1 * | 4/2008 | Clingman | H01L 41/25 29/25.35 |
| 2008/0100179 A1 * | 5/2008 | Rugged | H01L 41/12 310/332 |
| 2011/0147533 A1 | 6/2011 | Goossen et al. | |
| 2011/0168835 A1 * | 7/2011 | Oliver | B64D 27/06 244/12.4 |
| 2015/0008292 A1 * | 1/2015 | Bernhardt | B64C 21/08 244/213 |
| 2016/0332741 A1 * | 11/2016 | Moxon | B64C 21/00 |
| 2018/0339772 A1 * | 11/2018 | McCullough | B64C 39/04 |

* cited by examiner

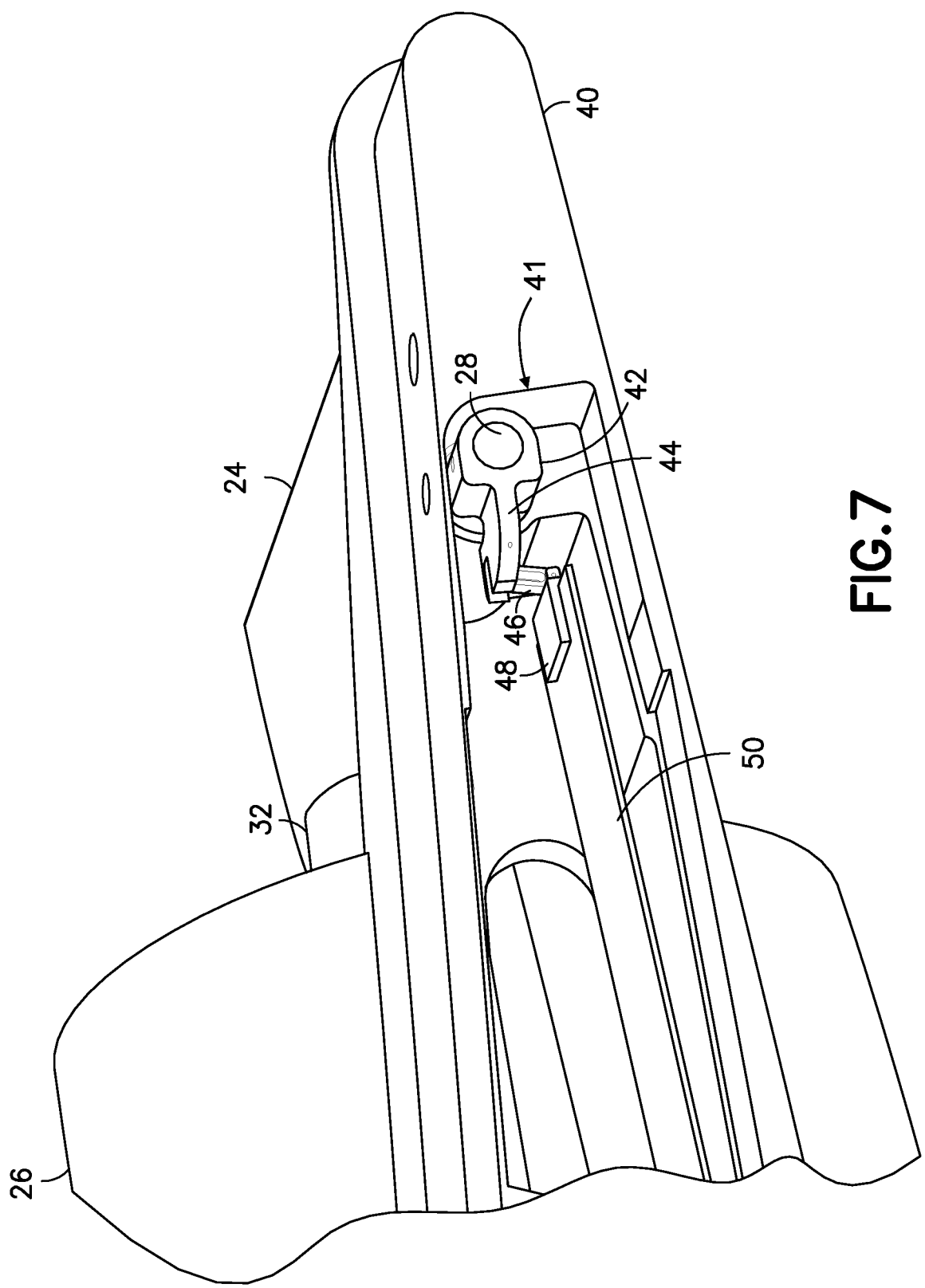

PIEZOELECTRIC THRUST VECTOR CONTROL FOR DUAL-MODE UNMANNED AERIAL VEHICLE

BACKGROUND

This disclosure generally relates to motors that utilize shape changing materials to generate mechanical energy deliverable to a mechanical device. In particular, the technology disclosed herein relates to piezoelectric actuators adapted for use with flow control systems on aircraft and spacecraft.

Piezoelectric devices are often used in small, compact, light-weight motor applications to provide mechanical energy that can be used to generate mechanical work. Generally, a voltage is applied to a structure, e.g., a beam, comprising a piezoelectric material that causes the piezoelectric structure to flex or bow. For example, a piezoelectric beam can comprise piezoelectric layers formed on opposite sides of a flexible supporting substrate. In such instances, the voltage is applied across one of the piezoelectric layers causing this first layer to elongate, while substantially simultaneously, a reverse voltage is applied across the other piezoelectric layer causing the second layer to shorten. Thus, the beam is caused to bow or flex, resulting in a physical displacement of at least a portion of the beam. This displacement can be utilized to provide mechanical work.

A tailsitter is a type of vertical takeoff and landing (VTOL) aircraft that takes off and lands on its tail and tilts horizontally for forward flight. However, in many situations maneuvering a tailsitter unmanned aerial vehicle (hereinafter "tailsitter UAV") having unducted propellers near obstacles (such as wires, trees, and walls) or other UAVs without propeller strike is a challenge.

VTOL flight has been demonstrated in UAVs having propeller assemblies mounted within ducts (referred to hereinafter as "ducted fans"). Propeller ducting increases the efficiency of the propulsion unit. In addition, a ducted fan arrangement overcomes the problem of propeller strike, but sacrifices roll maneuverability given the reduced torque dynamics of ducted fans. A tailsitter UAV capable of low-energy high-rate maneuvers for both vertical roll control and horizontal pitch control is desired.

SUMMARY

The subject matter disclosed in some detail below is directed to a ducted-fan UAV (e.g., a tailsitter UAV) capable of low-energy high-rate maneuvers for both vertical roll control and horizontal pitch control. The maneuverability of the UAV is enhanced by equipping the ducted fans with respective piezoelectric-actuated thrust vectoring flaps. Thrust vector control is the ability of an aircraft to manipulate the direction of the thrust produced by its engines or motors in order to control the attitude or angular velocity of the aircraft. In the embodiments disclosed herein, thrust vector control is achieved by controlling the angular positions of a plurality of thrust vector flaps pivotably coupled at respective outlets of a plurality of ducts having fan rotors at the inlets. Each thrust vectoring flap has only one degree of freedom in the frame of reference of the UAV, namely, rotation about a single axis that is perpendicular to the axis of the duct.

In accordance with the embodiments disclosed herein, the angular position of each thrust vectoring flap is adjusted by activating a respective piezoelectric actuator, e.g., a piezoelectric bimorph actuator. A bimorph is a cantilevered beam or plate used for actuation which consists of two piezoelectrically active layers. It can also have a passive layer between the two active layers. In actuator applications, one active layer contracts and the other expands when a sufficient voltage is applied, thereby causing the piezoelectric bimorph actuator to bend.

Although various embodiments of apparatus and methods for controlling the attitude of a ducted-fan UAV using thrust vectoring flaps will be described in some detail below, one or more of those embodiments may be characterized by one or more of the following aspects.

One aspect of the subject matter disclosed in detail below is a propulsion system comprising: a ducted fan comprising a fan rotor, a fan motor operatively coupled to the fan rotor for driving rotation of the fan rotor, and a duct having an inlet and an outlet, the fan rotor being disposed inside the duct; a flap pivotably coupled to the ducted fan in proximity to the outlet of the duct; a piezoelectric actuator operatively coupled to the flap and configured to drive movement of the flap by flexing in response to receipt of electric power; an electronic thrust vectoring controller configured to control the amount of electric power supplied to the piezoelectric actuator; and a power source connected to provide electric power to the piezoelectric actuator and to the electronic thrust vectoring controller. In the disclosed embodiment, the piezoelectric actuator is a piezoelectric bimorph actuator.

In accordance with some embodiments of the propulsion system described in the immediately preceding paragraph, the propulsion system further comprises: a flap rotation shaft having first and second portions, the flap being affixed to the first portion of the flap rotation shaft; a bell crank affixed to the second portion of the flap rotation shaft; a connecting rod having one end pivotably coupled to the bell crank and another end pivotably coupled to the piezoelectric actuator; and an adapter configured in the form of a pylon to couple the ducted fan to a wing of an unmanned aerial vehicle and further configured to have a recess, the bell crank, connecting rod and piezoelectric actuator being disposed inside the recess of the adapter. In the disclosed embodiment, the flap has a center-of-gravity located between the flap rotation shaft and a leading edge of the flap.

In accordance with some embodiments, the propulsion further comprises a bimorph support device that adjustably retains another end of the piezoelectric actuator, wherein the bimorph support device comprises: a mounting block having a fixed position relative to the duct; a first flexural hinge integrally formed with the mounting block; and a flexible clip that is integrally formed with the first flexural hinge. The flexible clip in turn comprises: a first cantilevered flexural element configured to bend relative to the mounting block due to flexure of the first flexural hinge; a second flexural hinge integrally formed with the first cantilevered flexural element; and a second cantilevered flexural element configured to bend relative to the first cantilevered flexural element due to flexure of the second flexural hinge.

Another aspect of the subject matter disclosed in detail below is an unmanned aerial vehicle comprising: first and second wings; first and second propulsion units respectively attached to the first and second wings; a computer system configured to control operation of the first and second propulsion units; and a power source connected to provide electric power to the computer system, wherein each of the first and second propulsion units comprises: a ducted fan comprising a fan rotor, a fan motor operatively coupled to the fan rotor for driving rotation of the fan rotor, and a duct having an inlet and an outlet, the fan rotor being disposed inside the duct; a flap pivotably coupled to the ducted fan in proximity to the outlet of the duct; and a piezoelectric actuator operatively coupled to the flap and configured to drive movement of the flap by flexing in response to receipt of electric power from the power source.

A further aspect of the subject matter disclosed in detail below is a method for adjusting an attitude of an unmanned aerial vehicle, the method comprising: rotating a fan rotor enshrouded in a duct to propel air out of an outlet of the duct; and pivoting a flap to an angular position where air exiting the outlet of the duct is deflected by the flap, wherein pivoting a flap comprises: supplying electrical power to a piezoelectric actuator having a voltage sufficient to cause the piezoelectric actuator to bend; clasping one end of the piezoelectric actuator using a flexible clip while another end of the flexing piezoelectric actuator displaces relative to the flexible clip; and converting displacement of the other end of the piezoelectric actuator into pivoting of the flap toward the angular position.

In accordance with one embodiment of the method described in the immediately preceding paragraph, a center-of-gravity of the flap is located between an axis of rotation of the flap and a leading edge of the flap, and the flexible clip rotates about a flexural hinge as the piezoelectric actuator flexes.

Other aspects of apparatus and methods for controlling the attitude of a ducted-fan UAV using thrust vectoring flaps are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIG. 7 is a diagram representing a magnified three-dimensional view of the portions of the electric ducted fan depicted in FIG. 6B, including the mechanism which converts displacement of the piezoelectric actuator into movement (e.g., rotation) of the thrust vectoring flap.

Reference will hereinafter be made to the drawings in which similar elements in different drawings bear the same reference numerals.

DETAILED DESCRIPTION

For the purpose of illustration, apparatus and methods for controlling the attitude of a ducted-fan UAV using thrust vectoring flaps will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In accordance with the embodiments disclosed in some detail below, the UAV takes the form of a rotorcraft having at least three fan rotors. In accordance with the implementation disclosed herein, each fan rotor has at least two mutually diametrically opposed fan blades. However, in alternative implementations, UAVs having fan rotors with more than two fan blades may be used. As used herein, the term "fan rotor" refers to a rotating device that includes a rotor hub and two or more fan blades extending radially outward from the rotor hub. In the embodiments disclosed herein, the rotor hub is mechanically coupled to an output shaft of a drive motor, referred to hereinafter as a "fan motor". The fan motor drives rotation of the fan rotor. The fan motor may be en electric motor or a fuel-burning engine.

Figure 1:
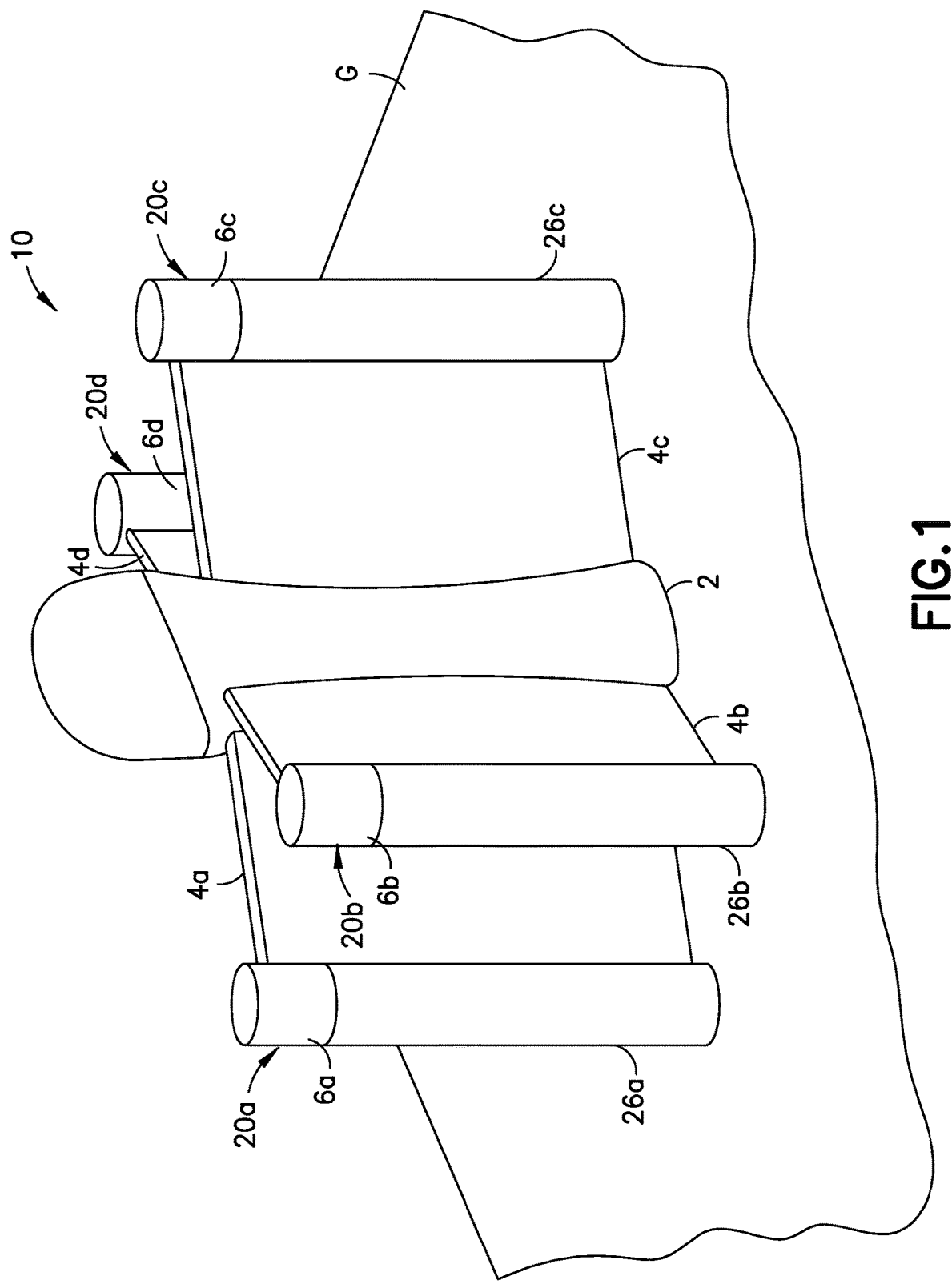
FIG. 1 is a diagram representing a three-dimensional view of a tailsitter UAV sitting on the ground in a vertical takeoff position.

FIG. 1 is a diagram representing a three-dimensional view of a tailsitter UAV 10 (hereafter "UAV 10") sitting on ground G in a vertical takeoff position. In the example depicted in FIG. 1, the UAV 10 includes a fuselage 2, four wings 4a-4d extending outward from the sides of the fuselage 2 in an X configuration, and four ducted fans 20a-20d respectively attached to the respective distal portions of wings 4a-4d. As used herein, the term "ducted fan" means a propulsion arrangement whereby a mechanical fan, which is a type of propeller, is rotatable inside a cylindrical fan shroud.

Each of ducted fans 20a-20d depicted in FIG. 1 includes a respective fan shroud and a respective fan nozzle which are attached to each other. More specifically: ducted fan 20a includes a fan shroud 6a and a fan nozzle 26a; ducted fan 20b includes a fan shroud 6b and a fan nozzle 26b; ducted fan 20c includes a fan shroud 6c and a fan nozzle 26c; and ducted fan 20d includes a fan shroud 6d and a fan nozzle 26d.

The tailsitter UAV depicted in FIG. 1 is a type of vertical takeoff and landing (VTOL) aircraft that takes off and lands on its tail and tilts horizontally for forward flight. In the scenario depicted in FIG. 1, the UAV 10 is sitting on the ground after having landed and before the next takeoff. After takeoff, the UAV 10 tilts horizontally for forward flight. For example, the UAV 10 may fly while in a horizontal position to a destination and then hover at the destination while maintaining a vertical position to conduct surveillance using an onboard camera.

Figure 2:
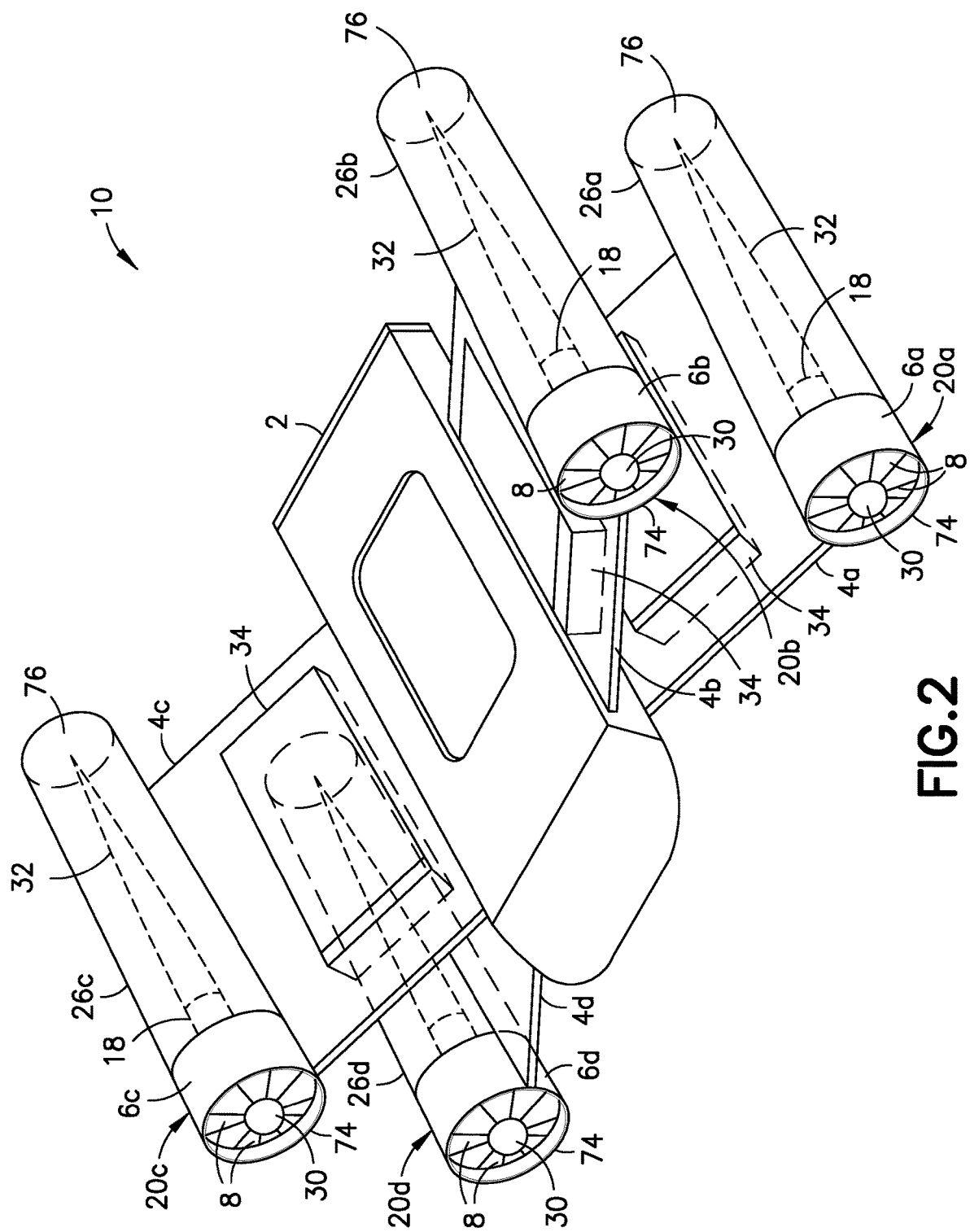
FIG. 2 is a diagram representing a three-dimensional view of a tailsitter UAV flying horizontally.

FIG. 2 is a diagram representing a three-dimensional view of a UAV 10 flying horizontally. As seen in FIG. 2 (but not visible in FIG. 1), each of the ducted fans 20a-20d further includes a respective fan rotor which is enshrouded by a respective fan shroud. More specifically: ducted fan 20a includes a fan rotor 5a enshrouded by fan shroud 6a; ducted fan 20b includes a fan rotor 5b enshrouded by fan shroud 6b; ducted fan 20c includes a fan rotor 5c enshrouded by fan shroud 6c; and ducted fan 20d includes a fan rotor 5d enshrouded by fan shroud 6d. Each of the fan rotors 5a-5d includes a respective rotor hub 30 having a streamlined nose and a respective plurality of fan blades 8 which extend radially outward from the rotor hub 30.

As indicated by dashed lines in FIG. 2, each of the ducted fans 20a-20d further includes a respective fan motor 18 and a respective tail cone 32 extending aft of the respective fan motor 18. Each of the fan nozzles 26a-26d has a respective fan motor 18 and respective tail cone 32 disposed therein. In accordance with the embodiment depicted in FIG. 2, the fan motors 18 are electric fan motors that receive electric power from one or more batteries 34 onboard the UAV 10. Each of the wings 4a-4d may be configured to receive and support a respective battery 34 that increases the stiffness of the respective wing and that supplies electric power to the electrically powered systems (including fan motors 18) onboard the UAV 10. Optionally, the UAV 10 may be further equipped with solar cells (not shown in the drawings) that provide electric power for recharging the batteries 34. For example, respective solar cells may be mounted on the plurality of wings 4a-4d.

In the disclosed embodiment, each of the fan motors 18 includes a circular cylindrical housing having an outer diameter that is less than the inner diameter of the respective one of the fan nozzles 26a-26d, thereby creating an annular channel for the flow of air from the inlet 74 of a respective one of the fan shrouds 6a-6d to the outlet 76 of a respective one of the fan nozzles 26a-26d. Each of the fan nozzles 26a-26d may be tapered to match the taper of the respective tail cone 32 as the outer diameter of the tail cone decreases in the aft direction (i.e., the direction in which air flows through the duct). For the purpose of illustration, the flow through the duct of a typical electric ducted fan 20 will now be described in some detail with reference to FIG. 3. The basic aerodynamic principles described in the following paragraph are equally applicable to the ducted fans 20a-20d depicted in FIGS. 1 and 2.

Figure 3:
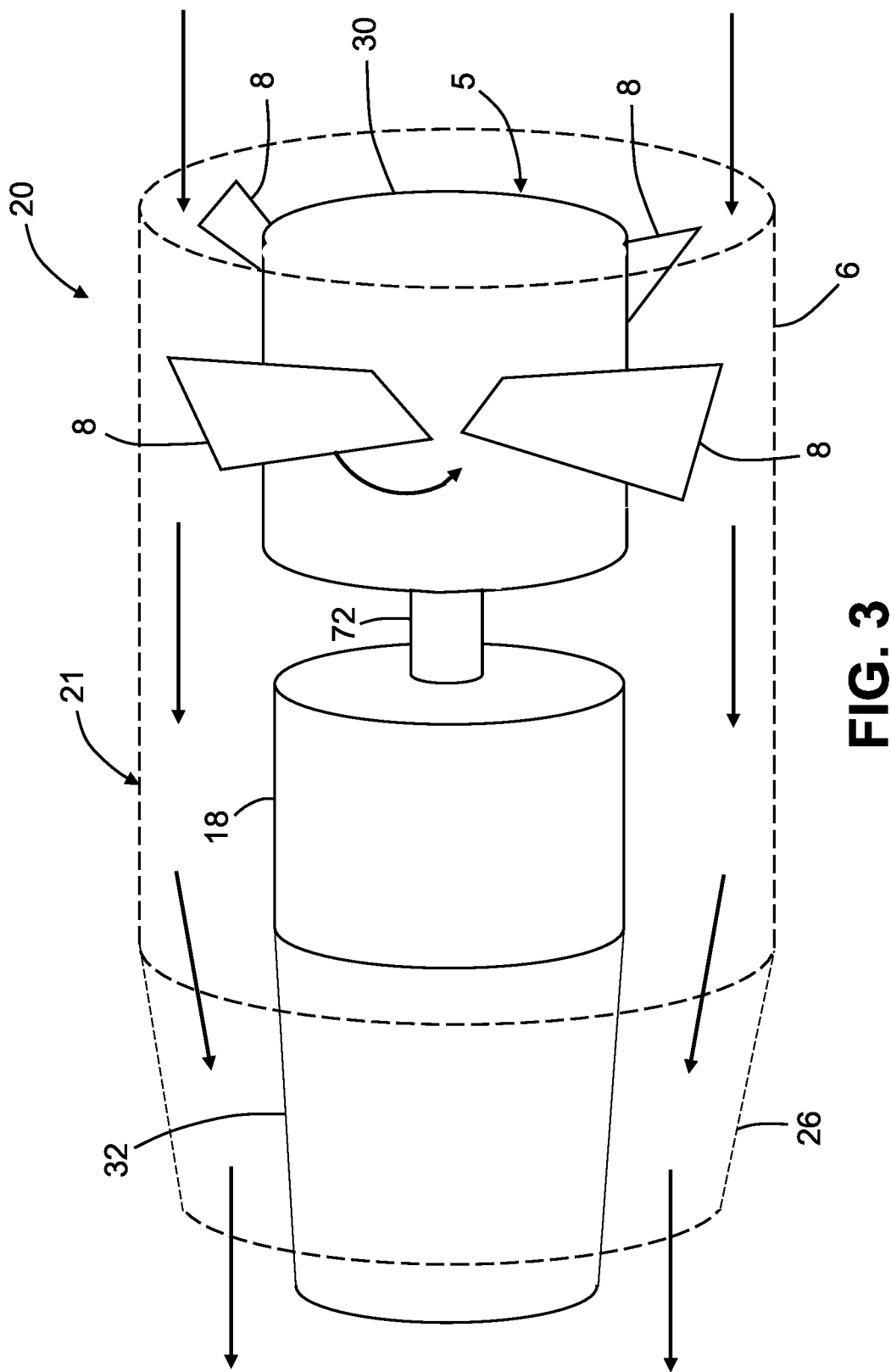
FIG. 3 is a diagram representing a three-dimensional view of some components disposed inside the duct of an electric ducted fan. The duct is indicated by dashed lines.

FIG. 3 is a diagram representing a three-dimensional view of some components disposed inside the duct 21 of a typical electric ducted fan 20. The duct 21 (indicated by dashed lines) includes a fan shroud 6 that enshrouds a fan rotor 5. The duct 21 further includes a fan nozzle 26 that surrounds a portion of the tail cone 32. In one proposed implementation, the fan nozzle 26 is attached to the fan shroud 6. The rotor hub 30 of the fan rotor 5 is mounted to the distal end of an output shaft 72 of a fan motor 18. The duct 21 may be configured in different ways. For example, the duct 21 may be configured so that the fan shroud 6 surrounds the fan motor 18 (in addition to enshrouding the fan rotor 5). In another example, the duct 21 may be configured so that the fan nozzle 26 surrounds the fan motor 18 (in addition to surrounding a portion of the tail cone 32).

As seen in FIG. 3, in a typical electric ducted fan 20, the fan rotor 5, fan motor 18 and tail cone 32 are arranged in sequence along the axis of the duct 21 starting at the inlet 74 of duct 21 and projecting beyond the outlet 76 of duct 21. In operation, the fan rotor 5 rotates (indicated by an arc-shaped arrow in FIG. 3) to draw air into the duct 21 and impel the air rearward, as indicated by straight arrows in FIG. 3. Although not shown in FIG. 3, the electric ducted fan 20 further includes a stator comprising four planar stator blades disposed aft of the fan rotor 5. For example, the stator blades may be integrally formed with the duct 21. The tail cone 32 may be integrally formed with the stator blades. The air is drawn through fan rotor 5, directed by the stator to flow in parallel through the annular channel formed by the duct 21 and the fan motor 18. That parallel air flow then converges and is accelerated as the air flows through the convergent annular channel formed by the fan nozzle 26 of duct 21 and the tail cone 32 and then exits the outlet 76 of duct 21. The acceleration of the air through duct 21 propels electric ducted fan 20 in a forward direction. In this manner, a multiplicity of electric ducted fans 20 attached to a UAV may be concurrently activated to propel the UAV upward during vertical takeoff or forward during horizontal flight. Alternatively, in a hover mode, the multiplicity of electric ducted fans 20 are concurrently activated to produce a total thrust force (the sum of individual thrust forces) equal to the weight of the UAV.

The maneuverability of a ducted-fan UAV (such as the UAV depicted in FIGS. 1-3) may be enhanced by equipping the ducted fans with respective piezoelectric-actuated thrust vectoring flaps. In particular, thrust vectoring may be used when the UAV is in a hover mode to cause the hovering UAV to roll about its body axis (hereinafter "roll axis"). For example, if the roll axis is oriented generally vertical, thrust vectoring may be used to rotate an onboard camera about the roll axis of the UAV, thereby scanning the field-of-view of the camera across a landscape or skyscape for the purpose of surveillance or intelligence gathering. In the embodiments disclosed hereinafter, thrust vector control is achieved by controlling the angular positions of a plurality of thrust vector flaps pivotably coupled at respective outlets of a plurality of ducted fans attached to the wings of a UAV. Each thrust vectoring flap has only one degree of freedom in the frame of reference of the UAV, namely, rotation about a single axis that is perpendicular to the axis of the duct that produces the thrust to be vectored by the thrust vectoring flap.

Figure 4:
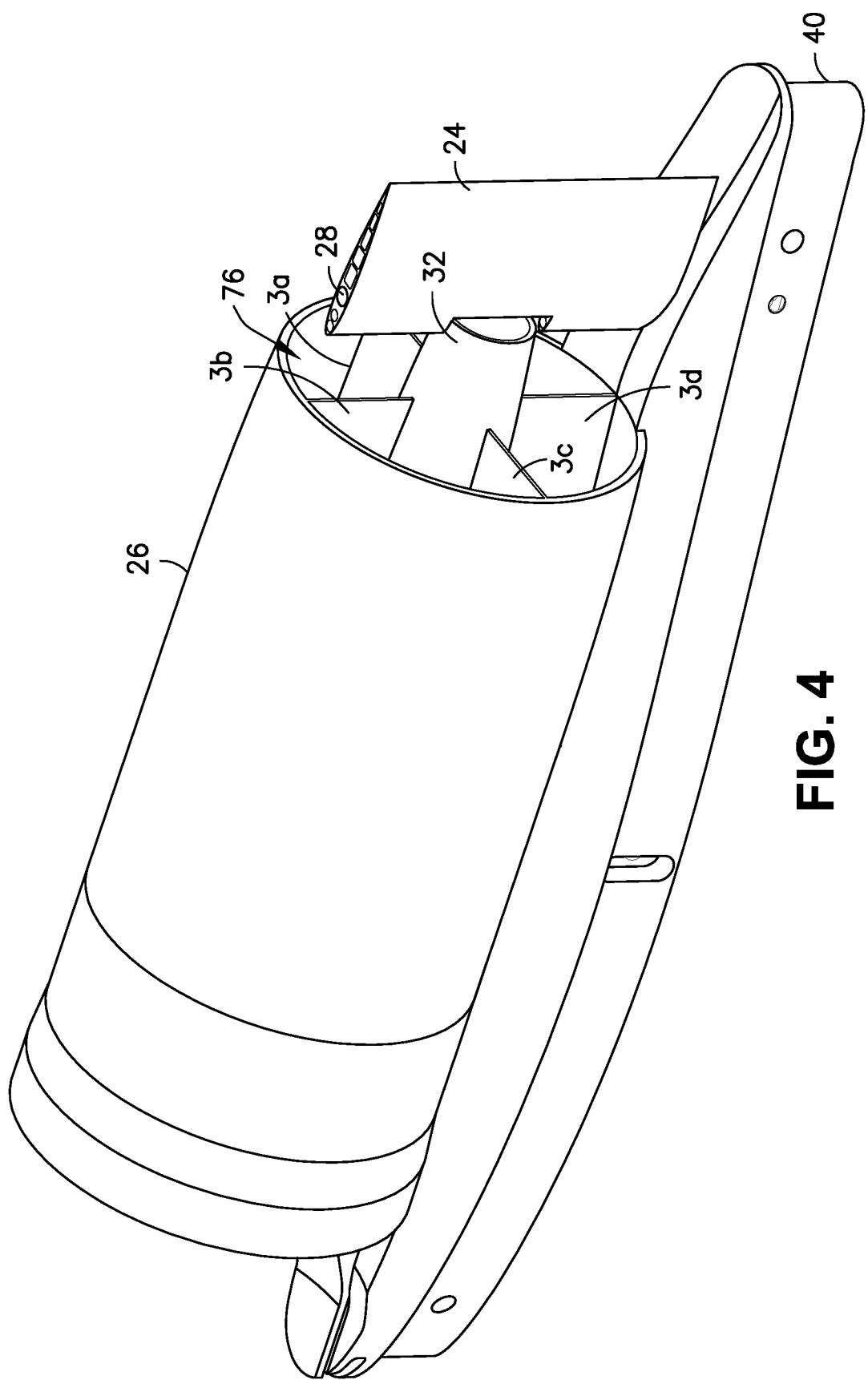
FIG. 4 is a diagram representing a three-dimensional view of a fan nozzle having a thrust vectoring flap and mounted to or integrally formed with an adapter configured for attachment to a wing of a UAV in accordance with one embodiment.

FIG. 4 is a diagram representing a three-dimensional view of a fan nozzle 26 having a thrust vectoring flap 24 in accordance one embodiment. In this particular embodiment, the fan nozzle 26 is integrally formed with an adapter 40 that is configured for attachment to a wing of a UAV 10. In accordance with an alternative embodiment, the fan nozzle 26 may be a separate component which is attached to the adapter 40. In the disclosed embodiment, the fan nozzle 26 and adapter 40 are made of a rigid plastic material.

As seen in FIG. 4, a thrust vectoring flap 24 is disposed aft of the outlet 76 of the fan nozzle 26. A stator comprising four planar stator blades 3a-3d is disposed between the fan nozzle 26 and the tail cone 32. The stator blades 3a-3d are distributed at equiangular intervals (90 degrees) in the annular channel bounded by the inner surface of the fan nozzle 26 and outer surface of the tail cone 32. In this example, the stator blades 3a-3d are integrally formed with the fan nozzle 26 and the tail cone 32.

The thrust vectoring flap 24 is pivotably coupled to the adapter 40 to enable rotation about an axis that is perpendicular to an axis of the fan nozzle 26. Thus, the movement of the thrust vectoring flap 24 is constrained to have only one degree of freedom. FIG. 4 shows the thrust vectoring flap 24 in the neutral angular position (zero degrees). When no thrust vectoring is desired, the thrust vectoring flap 24 is maintained in the neutral angular position; when thrust vectoring is desired, the thrust vectoring flap 24 is rotated away from the neutral angular position. In one proposed implementation, the thrust vectoring flap 24 may be pivoted a maximum of ±12 degrees in either direction. When the adapter 40 is attached to a wing of the type depicted in FIG. 2, the axis of rotation of the thrust vectoring flap 24 is parallel to a spanwise direction of the wing.

When the adapter 40 is attached to a wing of a UAV, the thrust vectoring flap 24 produces control moments about the pitch and roll axes of the UAV. For example, in a hover mode, at least two thrust vectoring flaps 24 may be pivoted in opposite directions to cause the UAV to roll about a generally vertically oriented roll axis. Quadcopters do not have this capability. Two thrust vectoring flaps 24, one on each side of the UAV, provide full control authority. Alternatively, each of the four ducted fans 20a-20d seen in FIG. 2 may be equipped with a respective thrust vectoring flap 24.

Figure 5:
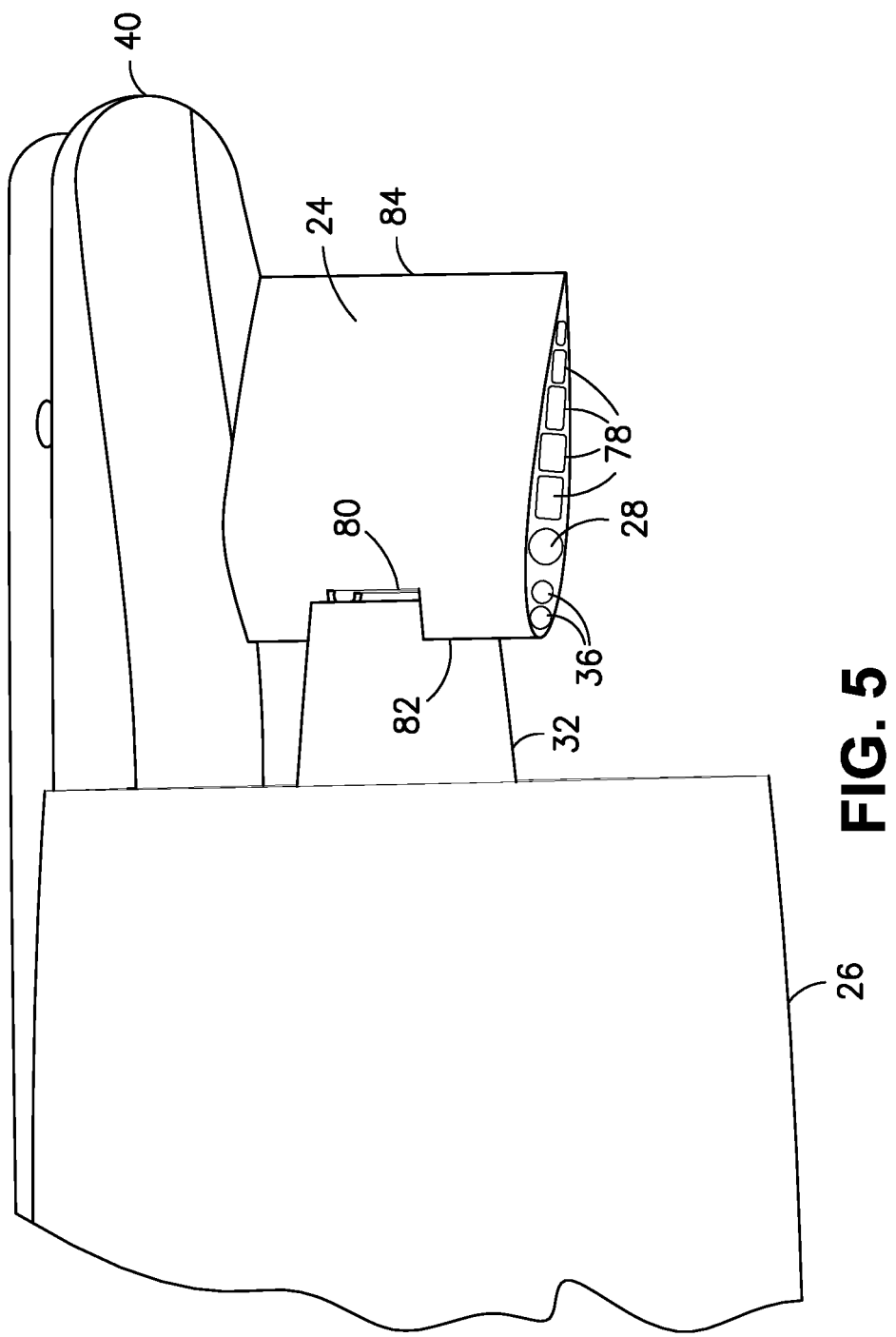
FIG. 5 is a diagram representing a three-dimensional view of a portion of the apparatus depicted in FIG. 4, which portion includes the thrust vectoring flap pivotably disposed at the outlet of the fan nozzle.

FIG. 5 is a diagram representing a three-dimensional view of a portion of the apparatus depicted in FIG. 4, which portion includes a thrust vectoring flap 24 pivotably disposed at the outlet of a fan nozzle 26. More specifically, the thrust vectoring flap 24 is mounted to a flap rotation shaft 28 that is pivotably coupled to an adapter 40.

In the disclosed embodiment, the thrust vectoring flap 24 is made of plastic material having a circular cylindrical bore that is occupied by the flap rotation shaft 28. The flap rotation shaft 28 is made of metal. The flap rotation shaft 28 is disposed closer to the leading edge 82 than to the trailing edge 84 of the thrust vectoring flap 24. The thrust vectoring flap 24 has a cutout 80 that provides clearance for the end of the tail cone 32 as the flap rotates. The thrust vectoring flap 24 has a chord length (i.e., the distance from the leading edge 82 to the trailing edge 84). In the disclosed embodiment, the axis of rotation of the flap rotation shaft 28 is located at approximately one-quarter of the chord length from the leading edge 82 of the thrust vectoring flap 24.

As seen in FIG. 5, the portion of the thrust vectoring flap 24 which is disposed aft of the flap rotation shaft 28 consists of a chambered body that has empty chambers 78 to reduce the weight of the aft portion of the flap. For example, the empty chambers 78 may extend in parallel with the spanwise direction of the thrust vectoring flap 24. Conversely, the portion of the thrust vectoring flap 24 which is disposed forward of the flap rotation shaft 28 has chambers which are occupied by rods 36 made of a high-density metallic material to increase the weight of the forward portion of the flap. For example, in one proposed implementation the rods 36 are made of tungsten. In the disclosed embodiment, the thrust vectoring flap 24 is designed so that its center-of-gravity is located between the axis of rotation of the flap rotation shaft 28 and the leading edge 82 of the thrust vectoring flap 24.

Figure 6A:
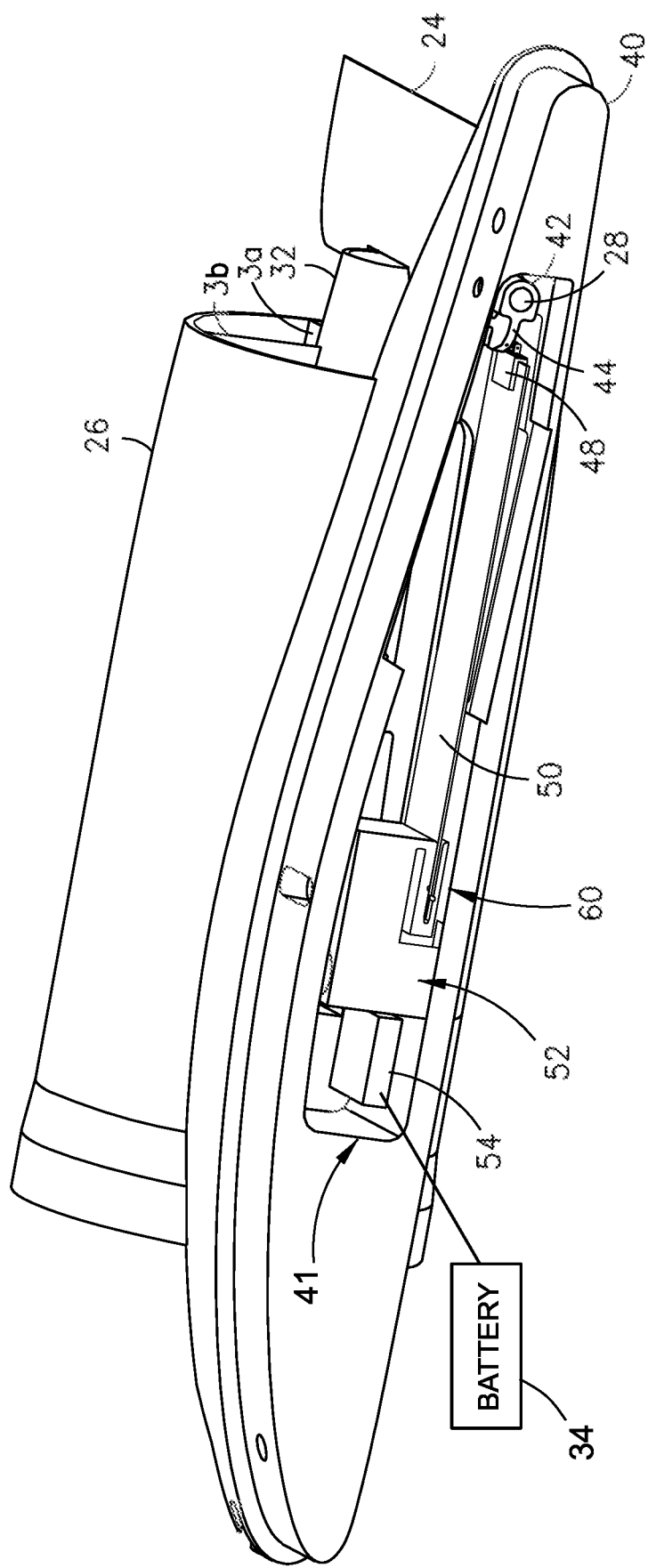
FIGS. 6A and 6B are diagrams representing respective three-dimensional views of the fan nozzle with adapter depicted in FIGS. 4 and 5, which views reveal a piezoelectric actuator for driving rotation of the thrust vectoring flap.
Figure 6B:
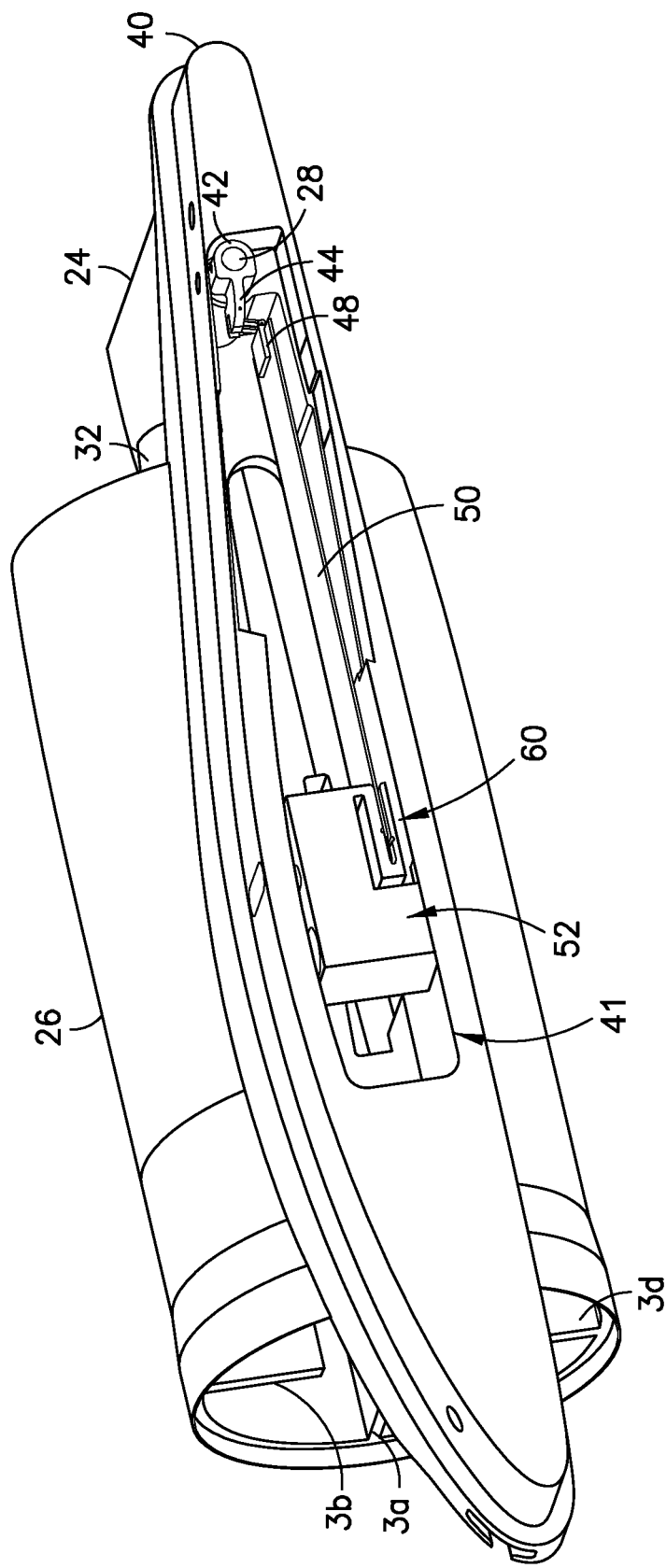

FIGS. 6A and 6B are diagrams representing respective three-dimensional views of the fan nozzle 26 with adapter 40 depicted in FIGS. 4 and 5, which views reveal a piezoelectric bimorph actuator 50 for driving rotation of the thrust vectoring flap 24 in accordance with one embodiment. The piezoelectric bimorph actuator 50 is installed inside a recess 41 formed in the adapter 40. One end of the piezoelectric bimorph actuator 50 is adjustably retained by a bimorph support device 52. The bimorph support device 52 is affixed to the adapter 40. The other end of the piezoelectric bimorph actuator 50 is mechanically coupled to the flap rotation shaft 28 in a manner such that displacement of the other end of the piezoelectric bimorph actuator 50 is converted into rotation of the thrust vectoring flap 24.

Piezoelectric actuators are solid-state devices that may be utilized to convert an electric potential, or voltage, into mechanical motion. Piezoelectric actuators include a piezoelectric element having a first side and an opposed second side, a first metallic electrode deposited on the first side, and a second metallic electrode deposited on the second side. The metallic electrodes provide a mechanism by which the electric potential may be applied to the piezoelectric element, and the piezoelectric element deforms (e.g., bends) upon application of the electric potential. In the case of the piezoelectric bimorph actuator 50 seen in FIG. 6A, a direct current is supplied to a piezoelectric drive amplifier 54 from a battery 34. The magnitude of the DC voltage output to the piezoelectric bimorph actuator 50 by the piezoelectric drive amplifier 54 (via wires or printed conductors not shown) is sufficient to cause the piezoelectric bimorph actuator 50 to bend.

The piezoelectric bimorph actuator 50 seen in FIGS. 6A and 6B is fabricated by laminating two thin beams or plates (not shown in the drawings) of a piezoelectric ceramic material (e.g., lead zirconate titanate) to opposite sides of a first metallic electrode and then depositing respective metallic electrodes on the opposing surfaces of the laminated beam or plate. The result is a bimorph actuator consisting of two independent flat piezoelectric elements, stacked on top of each other. By driving one element to expand while driving the other element to contract, the beam or plate is forced to bend, producing an output force and an out-of-plane displacement. While one end of the piezoelectric bimorph actuator 50 is adjustably retained, the other end of the activated piezoelectric bimorph actuator 50 displaces in a direction normal to the plane of the free end, thereby causing the thrust vectoring flap 24 to rotate. The direction in which the thrust vectoring flap 24 rotates is dependent on the direction in which the piezoelectric bimorph actuator 50 displaces, which direction in turn is dependent on the polarity of the DC voltage applied.

FIG. 7 is a diagram representing a magnified three-dimensional view of the portions of the electric ducted fan depicted in FIG. 6B, including the mechanism which converts displacement of one end of the piezoelectric bimorph actuator 50 into rotation of the thrust vectoring flap 24. The displacement-to-rotation conversion mechanism includes a bell crank 42, which is attached to one end of the flap rotation shaft 28. In one proposed implementation, the bell crank 42 has a circular cylinder bore having an inner diameter, while the portion of the flap rotation shaft 28 that is affixed in the circular cylinder bore of the bell crank 42 has an outer diameter slightly less than the inner diameter of the circular cylinder bore. The bell crank 42 has an arm 44 attached at a right angle relative to the flap rotation shaft 28 by which reciprocating motion of the distal end of the arm 44 is converted into rotation of the flap rotation shaft 28.

Still referring to FIG. 7, the displacement-to-rotation conversion mechanism further includes a connecting rod 46 having one end pivotably coupled to a clevis at the distal end of arm 44 of the bell crank 42 and another end connected to a clevis at one end of a connecting plate 48 attached to the unconstrained end of the piezoelectric bimorph actuator 50. From the viewpoint depicted in FIG. 7, connecting plate 48 displaces upward as the piezoelectric bimorph actuator 50 bends upward and the bell crank 42 rotates in a clockwise direction as connecting plate 48 displaces upward. Conversely, connecting plate 48 displaces downward as the piezoelectric bimorph actuator 50 bends downward and the bell crank 42 rotates in a counterclockwise direction as connecting plate 48 displaces downward. The displacement of the connecting plate 48 relative to the adapter 40 is constrained by its coupling to the connecting rod 46, which has only one degree of freedom.

Figure 8:
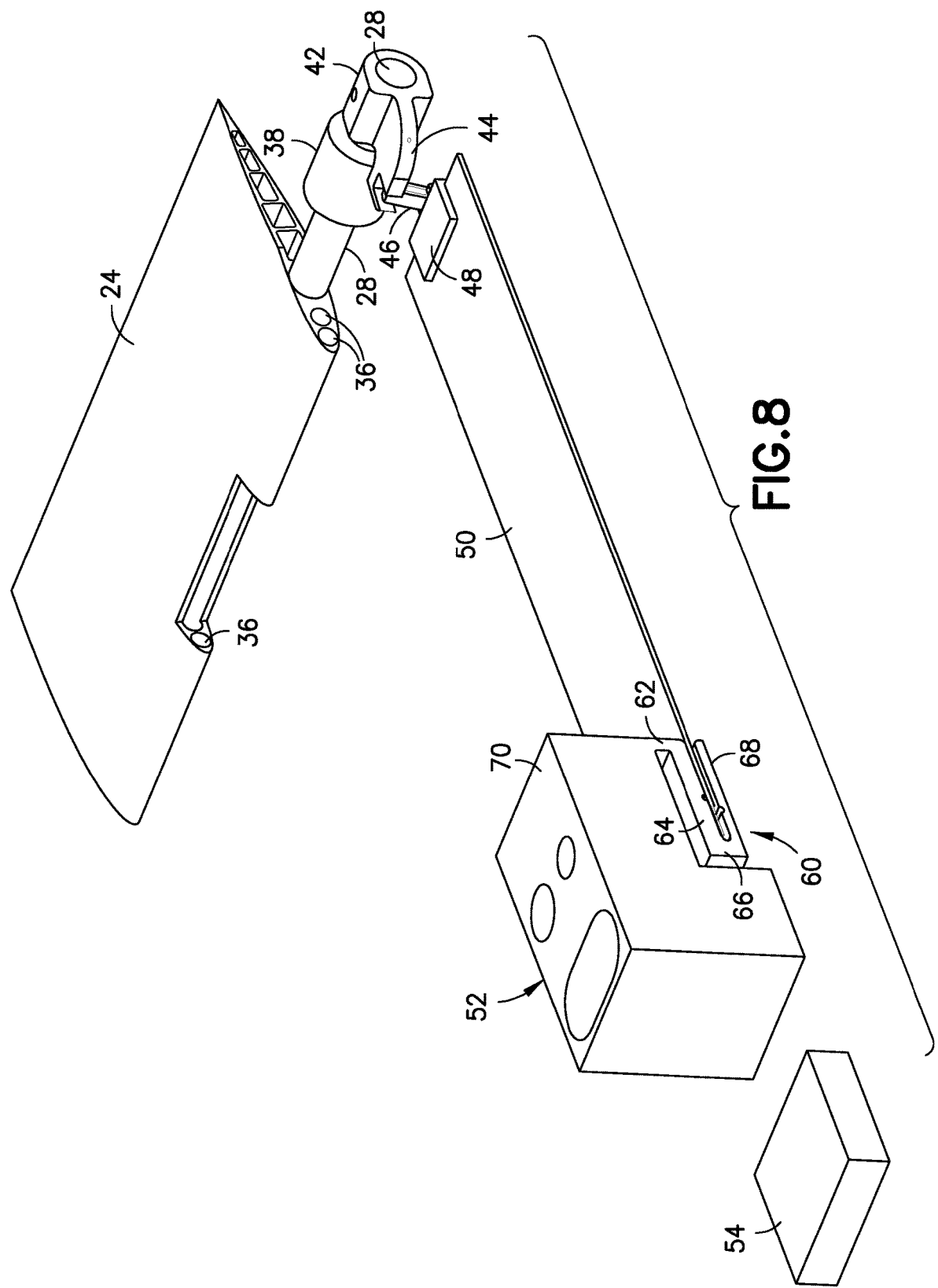
FIG. 8 is a diagram representing a three-dimensional view of components of an apparatus for adjusting the angular position of a thrust vectoring flap in accordance with one embodiment, which apparatus includes the mechanism depicted in FIG. 7.

FIG. 8 is a diagram representing a three-dimensional view of components of an apparatus for adjusting the angular position of a thrust vectoring flap 24 in accordance with the embodiment depicted in FIGS. 6A, 6B and 7. The flap rotation shaft 28 has first and second portions. The thrust vectoring flap 24 is affixed to the first portion of the flap rotation shaft 28. The bell crank 42 is affixed to the second portion of the flap rotation shaft 28. A third portion of the flap rotation shaft 28 is rotatably seated in a bearing 38, which bearing is affixed in a circular cylindrical recess formed in the adapter 40. In one proposed implementation, the bearing 38 is made of a metallic material (e.g., metal or metal alloy) and the adapter is made of a plastic material. The connecting rod 46 has one end pivotably coupled to the arm 44 of bell crank 42 and another end pivotably coupled to one end of the piezoelectric bimorph actuator 50. As used herein, "pivotably coupled to the piezoelectric bimorph actuator" includes being pivotably coupled to a connecting plate 48 that is affixed to the piezoelectric bimorph actuator 50 (as shown in FIG. 8) or being pivotably coupled directly to the piezoelectric bimorph actuator 50 (not shown in the drawings).

As seen in FIG. 8, the other end of the piezoelectric bimorph actuator 50 is adjustably retained by a bimorph support device 52 made of plastic material. The bimorph support device 52 includes a mounting block 70 which is affixed to the adapter 40. Thus the mounting block 70 has a fixed position relative to the adapter and relative to the duct. The bimorph support device 52 further includes a first flexural hinge 62 integrally formed with the mounting block 70 and a flexible clip 60 that is integrally formed with the first flexural hinge 62. In accordance with one proposed implementation, the flexible clip 60 includes a first cantilevered flexural element 64 having one end connected to and integrally formed with the first flexural hinge 62 and another end connected to and integrally formed with a second flexural hinge (which is also considered herein to be part of the flexible clip 60). The flexible clip 60 further includes a second cantilevered flexural element 68 having one end connected to and integrally formed with the second flexural hinge 66. The first cantilevered flexural element 64 is configured to bend relative to the mounting block 70 due to flexure of the first flexural hinge 62; the second cantilevered flexural element 68 is configured to bend relative to the first cantilevered flexural element 64 due to flexure of the second flexural hinge 66. The flexible clip 60 is designed to receive one end of the piezoelectric bimorph actuator 50 and thereafter adjustably retain that end during bending of the piezoelectric bimorph actuator 50.

FIG. 8 further depicts the piezoelectric drive amplifier 54, which outputs the DC voltages required to actuate the piezoelectric bimorph actuator 50. The electrical conductors connecting the piezoelectric drive amplifier 54 to the piezoelectric bimorph actuator 50 are not shown in FIG. 8. The piezoelectric drive amplifier 54, bimorph support device 52 and bearing 38 are all affixed to the adapter 40 depicted FIGS. 4, 6A and 6B.

Figure 9:
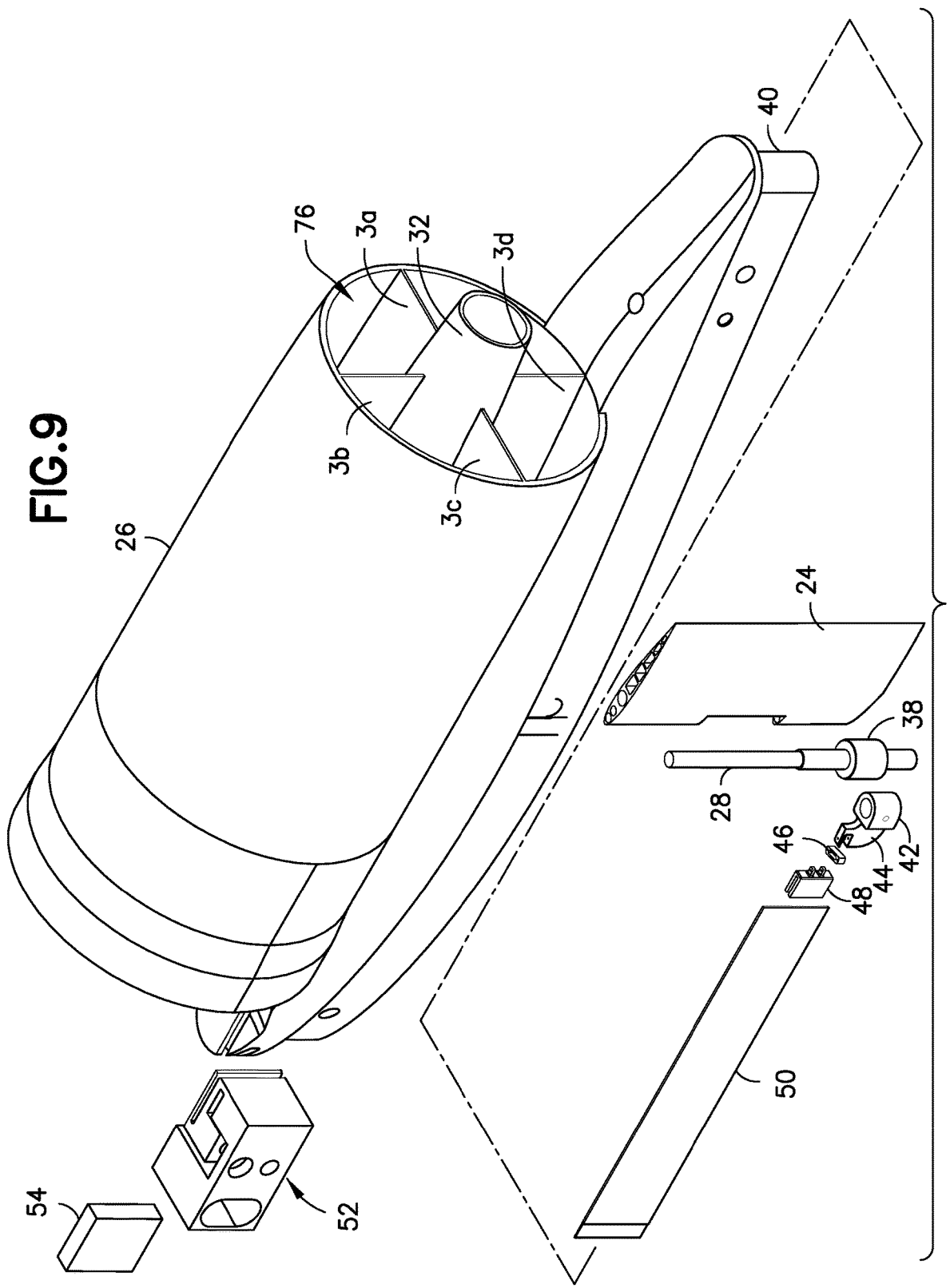
FIG. 9 is a diagram representing an exploded view of the individual components of the apparatus depicted in FIGS. 4, 6A and 6B.

FIG. 9 is a diagram representing an exploded view showing individual components of the apparatus depicted in FIGS. 4, 6A and 6B. In accordance with one proposed implementation, the structure that includes fan nozzle 26, tail cone 32, four stator blades 3a-3d and adapter 40 is an integrally formed structure fabricated by molding plastic material.

Figure 10:
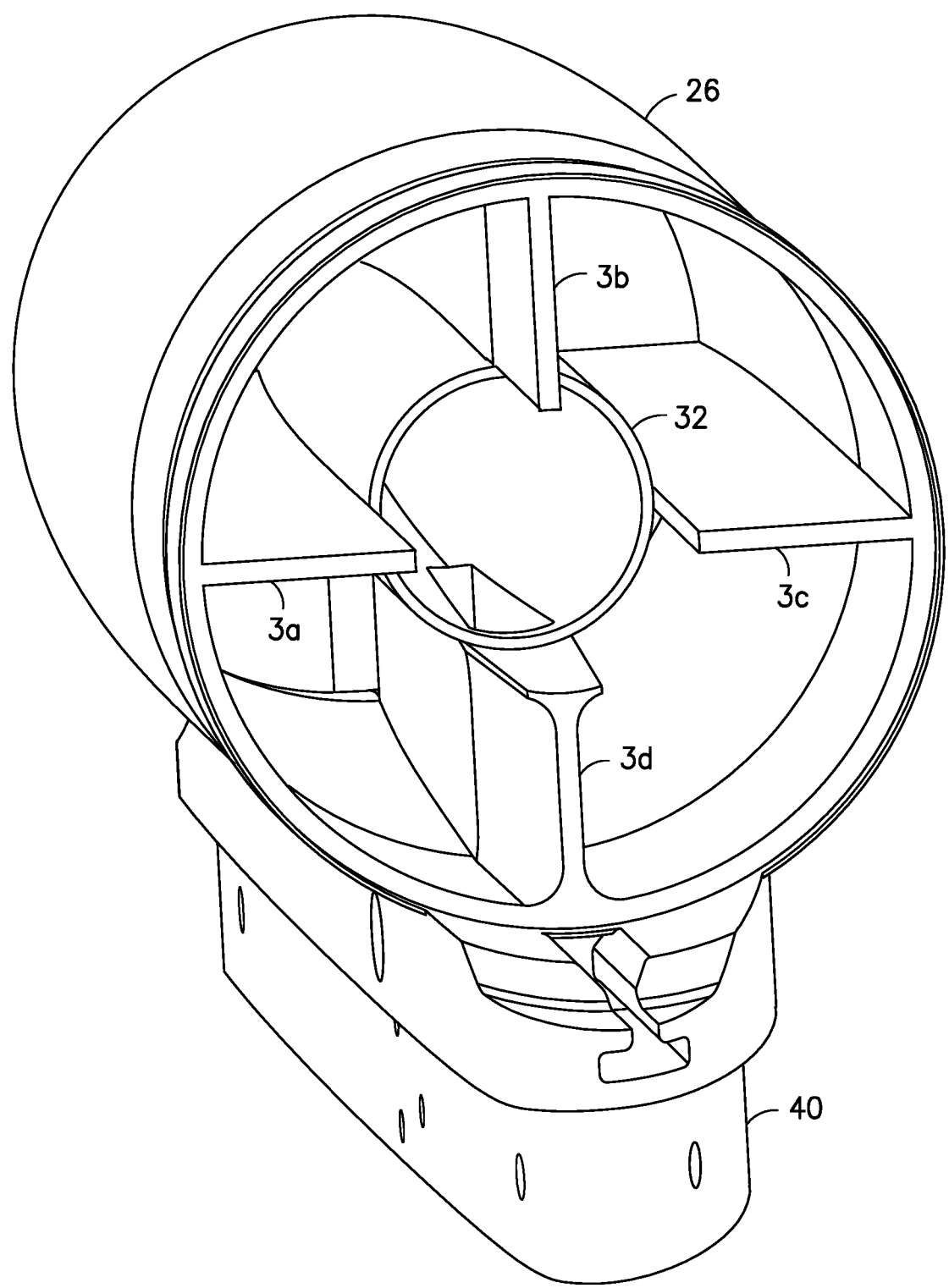
FIG. 10 is a diagram representing a three-dimensional view of the forward end of a fan nozzle 26 that is integrally formed with the adapter 40 in accordance with the embodiment depicted in FIGS. 4, 6A and 6B.

FIG. 10 is a diagram representing a three-dimensional view of the forward end of the fan nozzle 26 which is integrally formed with the adapter 40 in accordance with the embodiment depicted in FIGS. 4, 6A and 6B. As seen in FIG. 10, the forward ends of the stator blades 3a-3d extend forward of the forward end of the tail cone 32, leaving a space that will be occupied by a fan motor when the UAV is fully assembled. The air impelled rearward by the rotating fan blades flows through four channels defined by the internal surfaces of the fan nozzle 26, the surfaces of the stator blades 3a-3d, the external surfaces of the tail cone 32 and the external surface of the housing of the fan motor (not shown in FIG. 10, but see fan motor 18 in FIG. 3).

Figure 11:
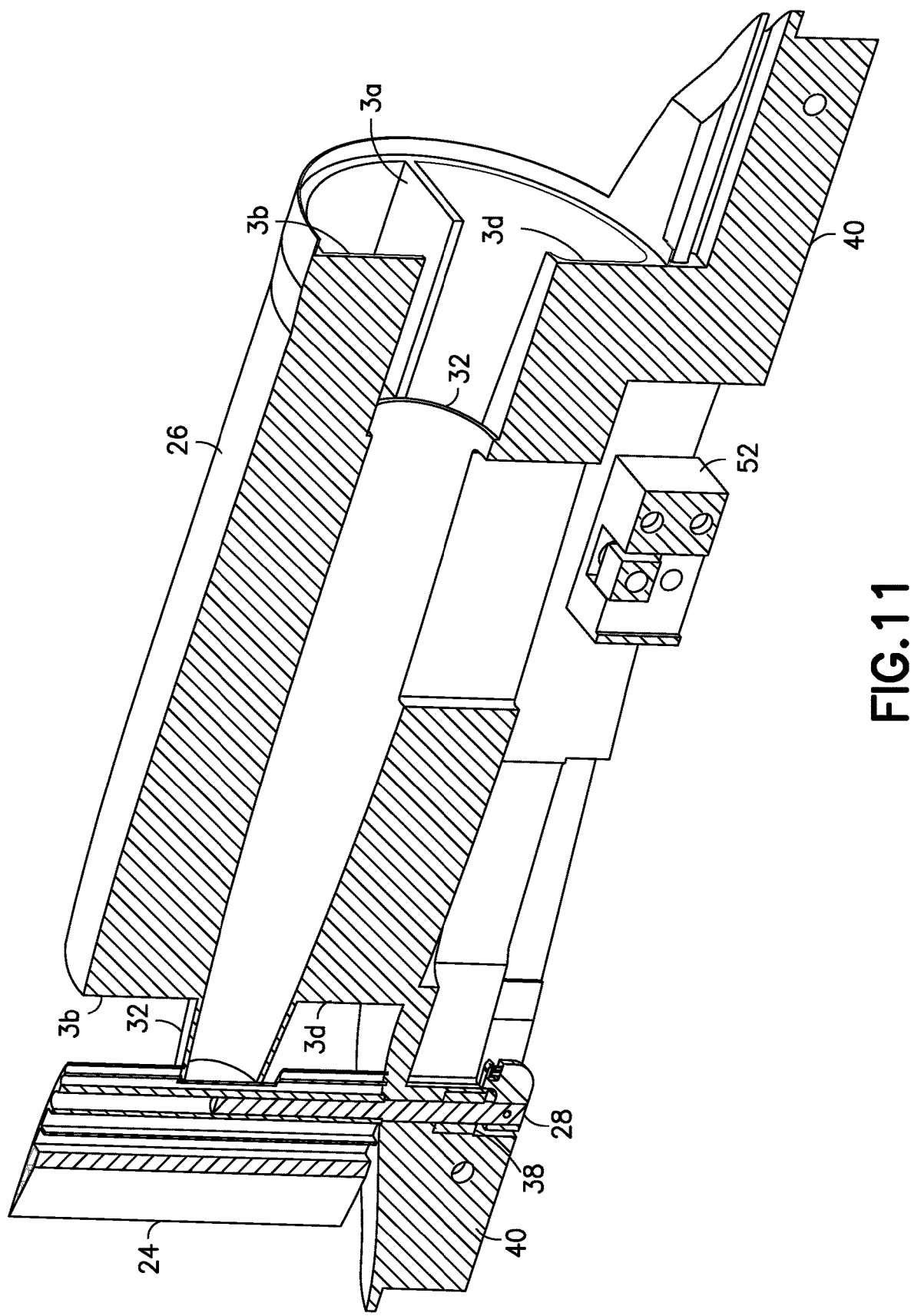
FIG. 11 is a diagram representing a three-dimensional sectional view of a fan nozzle integrally formed with the adapter that supports a thrust vectoring flap in accordance with one embodiment.

FIG. 11 is a diagram representing a three-dimensional sectional view of the fan nozzle 26 integrally formed with the adapter 40 that supports the thrust vectoring flap 24. FIG. 11 shows the thrust vectoring flap 24 rotatably coupled to the adapter 40 by means of the flap rotation shaft 28 and the bearing that rotatably supports the flap rotation shaft 28. FIG. 11 also shows the bimorph support device 52 attached to the adapter 40.

Figure 12:
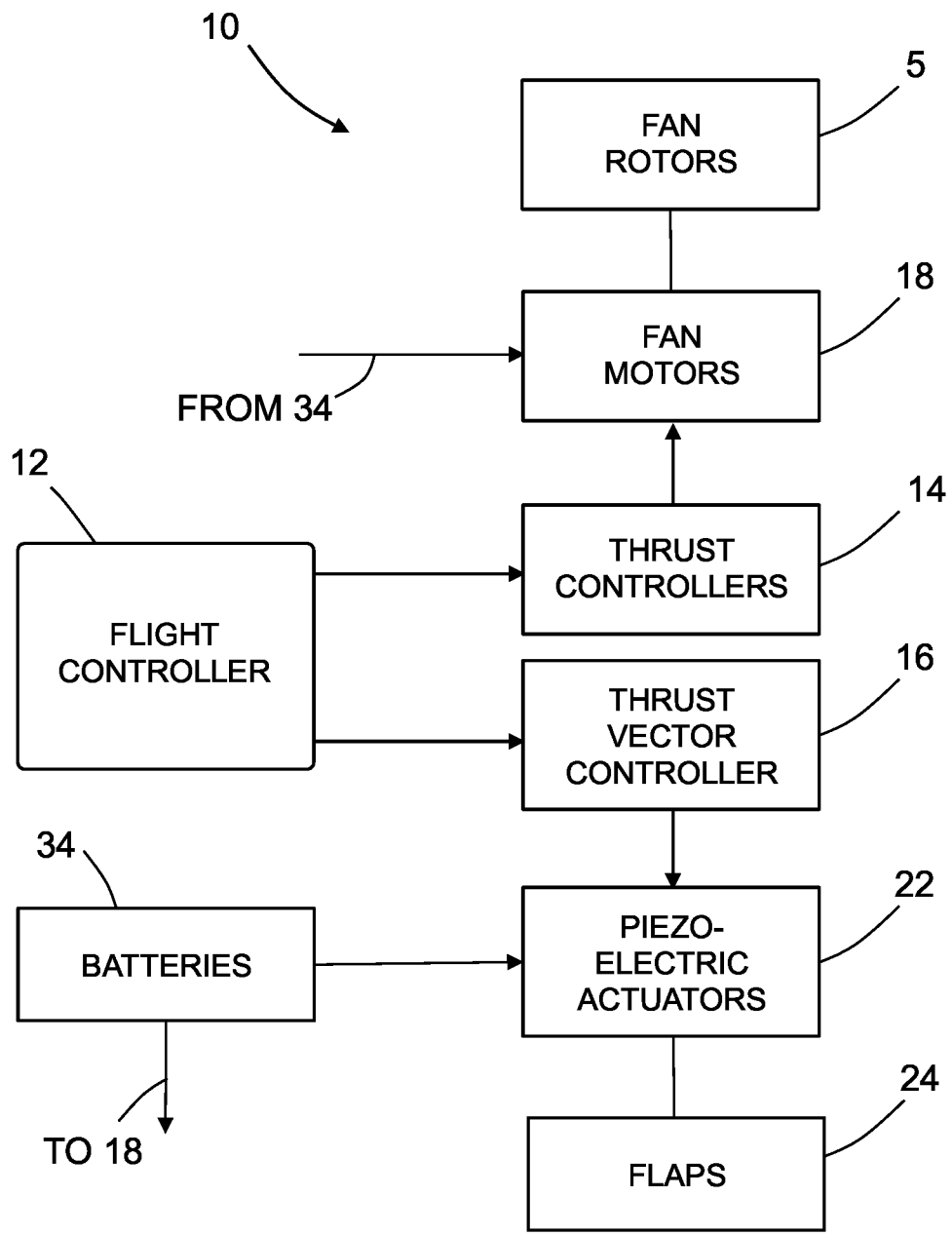
FIG. 12 is a block diagram identifying some components of a system for controlling the flight of a UAV having a plurality of ducted fans with respective thrust vectoring flaps in accordance with one embodiment.

FIG. 12 is a block diagram identifying some components of a system for controlling the flight of a UAV 10 having a plurality of ducted fans with respective piezoelectrically actuated thrust vectoring flaps 24 in accordance with one embodiment. The UAV 10 includes a flight controller 12, a plurality of thrust controllers 14 (one thrust controller per ducted fan) and a thrust vector controller 16. The flight controller 12 communicates directly with both the thrust controllers 14 and the thrust vector controller 16.

More specifically, the flight controller 12 is a computer or processor configured to send commands to the thrust controllers 14 for controlling the operation of the thrust-producing fan rotors 5 that drive rotation of the thrust-producing fan rotors 5. In the disclosed embodiment, the thrust controllers 14 are in the form of electronic speed control circuits configured to vary an electric motor's speed, direction and braking. Such electronic speed controllers provide high-frequency, high-resolution three-phase AC power to the motors, which are brushless electric motors.

Furthermore, the flight controller 12 is configured to send commands to the thrust vector controller 16 for controlling the operation of the piezoelectric actuators 22 that drive rotation of the thrust vectoring flaps 24. The thrust vector controller 16 includes a computer or processor that is configured to provide a DC current of sufficient voltage to activate the piezoelectric actuators 22.

The flight controller 12, thrust controllers 14 and thrust vector controller 16 all receive electrical power from one or more batteries (not shown in FIG. 12) onboard the UAV 10. The UAV 10 may also be equipped with a video camera (not shown in the drawings) that operates under the control of the flight controller 12. More specifically, the video camera may be activated by the flight controller 12 to acquire an image and then send the image data back to the flight controller 12 for storage in a non-transitory tangible computer-readable storage medium (not shown in the drawings) onboard the UAV and/or wireless transfer to a separate computer on the ground.

In order for a UAV 10 with a plurality of fan rotors 5 to rise into the air, a lifting force must be created which exceeds the force of gravity. The faster the rotors spin, the greater the lift and vice versa. The UAV 10 is capable of hovering, ascending or descending vertically or flying horizontally. To hover, the net upward thrust of the fan rotors 5 must equal the gravitational force being exerted on the UAV 10. The UAV 10 may ascend by increasing the thrust (speed) of the fan rotors 5 so that the upward force is greater than the weight of the UAV 10. The UAV 10 may descend by decreasing the rotor thrust (speed) of the fan rotors 5 so the net force is downward.

The functions attributed to the controllers identified in FIG. 12 may be implemented, at least in part, by hardware, software, firmware or any combination thereof. For example, various aspects of the techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components, embodied in an avionics system of UAV 10. The term "processor" or "processing circuitry" may generally refer to any of the foregoing logic circuitry, alone or in combination with other logic circuitry, or any other equivalent circuitry.

Such hardware, software, firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the controllers identified in FIG. 12 may be embodied as instructions on a non-transitory tangible computer-readable storage medium such as random access memory, read-only memory, non-volatile random access memory, electrically erasable programmable read-only memory, flash memory, magnetic data storage media, optical data storage media, or the like. The instructions may be executed to support one or more aspects of the functionality described in this disclosure.

Figure 13:
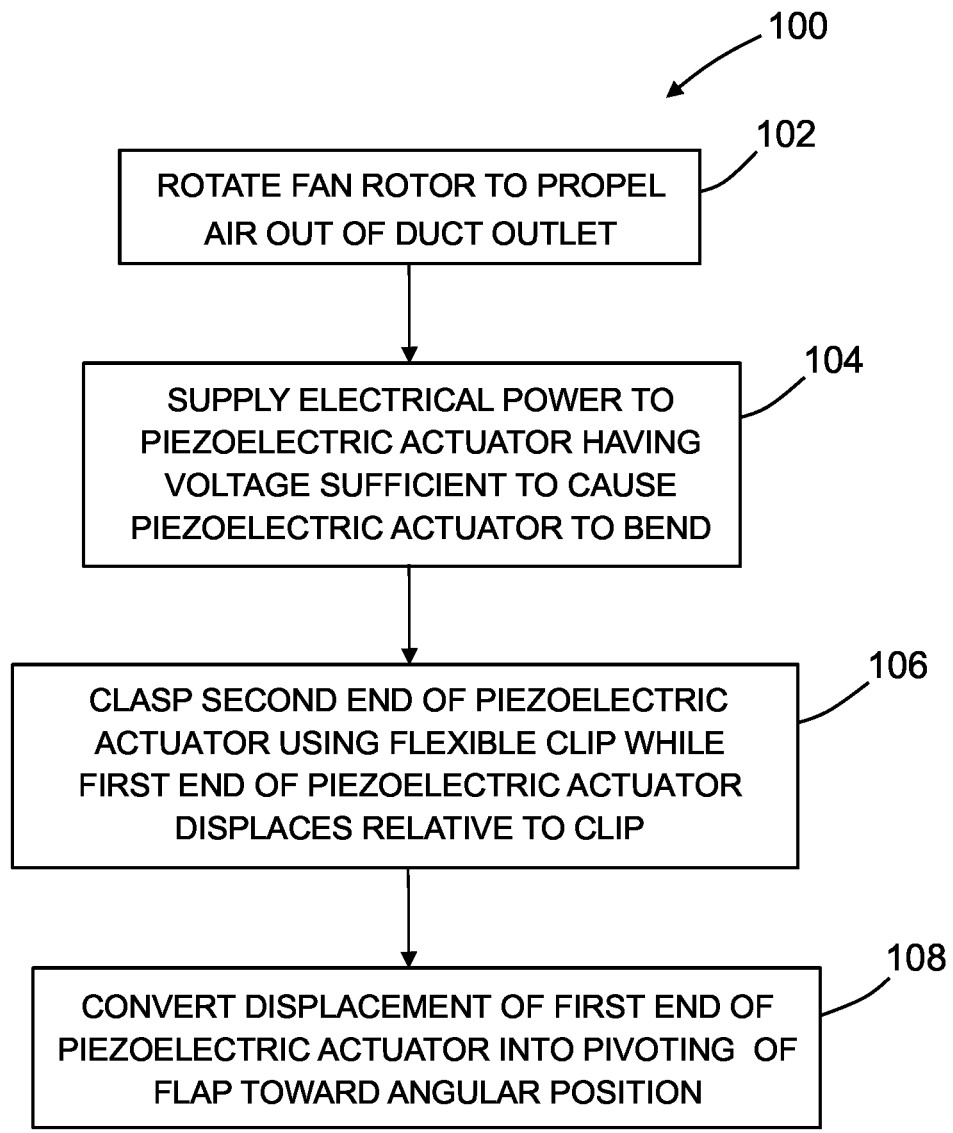
FIG. 13 is a flowchart identifying steps of a method for adjusting an attitude of an unmanned aerial vehicle using a propulsion system of the type depicted in FIG. 3.

FIG. 13 is a flowchart identifying steps of a method 100 for adjusting an attitude of an unmanned aerial vehicle 10 using a propulsion system of the type described herein. The method comprises: rotating a fan rotor 5 enshrouded in a duct 21 to propel air out of an outlet of the duct 21 (step 102); and pivoting a flap 24 to an angular position where air exiting the outlet of the duct 21 is deflected by the flap 24 (steps 104, 106, and 108. More specifically, the step of pivoting a flap 24 comprises: supplying electrical power to a piezoelectric actuator 50 having a voltage sufficient to cause the piezoelectric actuator 50 to bend (step 104); clasping a second end of the piezoelectric actuator 50 using a flexible clip 60 while a first end of the piezoelectric actuator 50 displaces relative to the flexible clip 60 (step 106); and converting displacement of the first end of the piezoelectric actuator 50 into pivoting of the flap 24 toward the angular position (step 108). The pivoting of the flap 24 changes a direction of the air propelled out of the outlet of the duct 21 to effect an adjustment to the attitude of the unmanned aerial vehicle 10.

While apparatus and methods for controlling the attitude of a ducted-fan UAV using thrust vectoring flaps have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The embodiments disclosed above use one or more computer systems. As used in the claims, the term "computer system" comprises a single processing or computing device or multiple processing or computing devices that communicate via wireline or wireless connections. Such processing or computing devices typically include one or more of the following: a processor, a controller, a central processing unit, a microcontroller, a reduced instruction set computer processor, an application-specific integrated circuit, a programmable logic circuit, a field-programmable gated array, a digital signal processor, and/or any other circuit or processing device capable of executing the functions described herein. The above examples are exemplary only, and thus are not intended to limit in any way the definition and/or meaning of the term "computer system". For example, the flight controller 12, thrust controllers 14 and thrust vector controller 16 identified in FIG. 12 may be interconnected to form a "computer system".

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A propulsion system comprising:
a ducted fan comprising:
a fan rotor,
a fan motor operatively coupled to the fan rotor for driving rotation of the fan rotor, and a duct having an inlet and an outlet, the fan rotor being disposed inside the duct;

a flap pivotably coupled to the ducted fan proximate the duct outlet and pivotable to angular positions where air exiting the duct outlet is deflected by the flap;

a piezoelectric actuator configured to displace one end of the piezoelectric actuator by flexing in response to receipt of electric power;

a displacement-to-rotation conversion mechanism attached to the flap and to the one end of the piezoelectric actuator, the displacement-to-rotation conversion mechanism being configured to convert displacement of the one end of the piezoelectric actuator into rotation of the flap;

an electronic thrust vector controller configured to control an amount of electric power supplied to the piezoelectric actuator; and a power source connected to provide electric power to the piezoelectric actuator and to the electronic thrust vector controller.

2. The propulsion system as recited in claim 1, wherein the piezoelectric actuator is a piezoelectric bimorph actuator.

3. The propulsion system as recited in claim 1, wherein the displacement-to-rotation conversion mechanism comprises:

a flap rotation shaft having first and second portions, the flap being affixed to the first portion of the flap rotation shaft;

a bell crank affixed to the second portion of the flap rotation shaft; and a connecting rod having one end pivotably coupled to the bell crank and another end pivotably coupled to the piezoelectric actuator.

4. The propulsion system as recited in claim 3, further comprising an adapter configured to couple the ducted fan to a wing of an unmanned aerial vehicle and further configured to have a recess, the bell crank, connecting rod and piezoelectric actuator being disposed within the adapter recess.

5. The propulsion system as recited in claim 3, wherein the flap has a chord length and the flap rotation shaft is located at approximately one-quarter of the chord length from a leading edge of the flap.

6. The propulsion system as recited in claim 5, wherein the flap has a center-of-gravity located between the flap rotation shaft and the leading edge of the flap.

7. The propulsion system as recited in claim 6, wherein the flap comprises:

a chambered body made of a plastic material and a rod made of a metallic material disposed in a chamber that is disposed between the flap rotation shaft and the leading edge of the flap.

8. The propulsion system as recited in claim 1, further comprising a support device that adjustably retains a portion of the piezoelectric actuator, wherein the support device comprises:

a mounting block having a fixed position relative to the duct;

a first flexural hinge integrally formed with the mounting block; and a flexible clip that is integrally formed with the first flexural hinge.

9. The propulsion system as recited in claim 8, wherein the flexible clip comprises:

a first cantilevered flexural element configured to bend relative to the mounting block due to flexure of the first flexural hinge;

a second flexural hinge integrally formed with the first cantilevered flexural element; and a second cantilevered flexural element configured to bend relative to the first cantilevered flexural element due to flexure of the second flexural hinge.

10. The propulsion system as recited in claim 1, wherein the fan motor is an electric fan motor, and the power source is further connected to provide electric power to the electric fan motor.

11. The propulsion system as recited in claim 1, wherein the power source comprises a battery.

12. An unmanned aerial vehicle comprising:

first and second wings;

first and second propulsion units respectively attached to the first and second wings;

a computer system configured to control operation of the first and second propulsion units; and a power source connected to provide electric power to the computer system, wherein each of the first and second propulsion units comprises:

a ducted fan comprising:

a fan rotor, a fan motor operatively coupled to the fan rotor for driving rotation of the fan rotor, and a duct having an inlet and an outlet, the fan rotor being disposed inside the duct;

a flap pivotably coupled to the ducted fan proximate the duct outlet and pivotable to angular positions where air exiting the duct outlet is deflected by the flap;

a piezoelectric actuator electrically connected to the power source, the piezoelectric actuator being configured to displace one end of the piezoelectric actuator by flexing in response to receipt of electric power from the power source; and a displacement-to-rotation conversion mechanism attached to the flap and to the one end of the piezoelectric actuator, the displacement-to-rotation conversion mechanism being configured to convert displacement of the one end of the piezoelectric actuator into rotation of the flap, wherein the computer system comprises an electronic thrust vector controller configured to control respective amounts of electric power supplied to the piezoelectric actuators of the first and second propulsion units.

13. The unmanned aerial vehicle as recited in claim 12, wherein the piezoelectric actuator is a piezoelectric bimorph actuator.

14. The unmanned aerial vehicle as recited in claim 12, wherein the displacement-to-rotation conversion mechanism comprises:

a flap rotation shaft having first and second portions, the flap being affixed to the first portion of the flap rotation shaft;

a bell crank affixed to the second portion of the flap rotation shaft; and a connecting rod having one end pivotably coupled to the bell crank and another end pivotably coupled to the piezoelectric actuator.

15. The unmanned aerial vehicle as recited in claim 14, wherein the flap has a chord length, the flap rotation shaft is located at approximately one-quarter of the chord length from a leading edge of the flap, and the flap has a center-of-gravity located between the flap rotation shaft and the leading edge of the flap.

16. The unmanned aerial vehicle as recited in claim 12, further comprising a support device that adjustably retains a portion of the piezoelectric actuator, wherein the support device comprises:
- a mounting block having a fixed position relative to the duct;
- a first flexural hinge integrally formed with the mounting block; and
- a flexible clip that is integrally formed with the first flexural hinge.

17. The unmanned aerial vehicle as recited in claim 16, wherein the flexible clip comprises:
- a first cantilevered flexural element configured to bend relative to the mounting block due to flexure of the first flexural hinge;
- a second flexural hinge integrally formed with the first cantilevered flexural element; and
- a second cantilevered flexural element configured to bend relative to the first cantilevered flexural element due to flexure of the second flexural hinge.

18. A method for adjusting an attitude of the unmanned aerial vehicle recited in claim 12, the method comprising:
- rotating a fan rotor enshrouded in a duct to propel air out of an outlet of the duct; and
- pivoting a flap to an angular position where air exiting the outlet of the duct is deflected by the flap, wherein pivoting a flap comprises:
- supplying electrical power to a piezoelectric actuator having a voltage sufficient to cause the piezoelectric actuator to bend;
- clasping a second end of the piezoelectric actuator using a flexible clip while a first end of the piezoelectric actuator displaces relative to the flexible clip; and
- converting displacement of the first end of the piezoelectric actuator into pivoting of the flap toward the angular position, which pivoting of the flap changes a direction of the air propelled out of the outlet of the duct to effect an adjustment to the attitude of the unmanned aerial vehicle.

19. The method as recited in claim 18, wherein a center-of-gravity of the flap is located between an axis of rotation of the flap and a leading edge of the flap.

20. The method as recited in claim 18, wherein the flexible clip rotates about a flexural hinge as the piezoelectric actuator bends.

* * * * *